(12) United States Patent
Ravindran et al.

(10) Patent No.: US 10,595,222 B2
(45) Date of Patent: Mar. 17, 2020

(54) ENABLING CROSS-LAYER RECEIVER ORIENTED DYNAMIC MULTICAST IN CELLULAR ACCESS

(71) Applicant: Futurewei Technologies, Inc., Plano, TX (US)

(72) Inventors: Ravishankar Ravindran, San Ramon, CA (US); Aytac Azgin, Santa Clara, CA (US); Syed Obaid Amin, Fremont, CA (US); Asit Chakraborti, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/027,837

(22) Filed: Jul. 5, 2018

(65) Prior Publication Data

US 2019/0281490 A1    Sep. 12, 2019

Related U.S. Application Data

(60) Provisional application No. 62/639,665, filed on Mar. 7, 2018.

(51) Int. Cl.
| | |
|---|---|
| H04L 12/28 | (2006.01) |
| H04W 28/02 | (2009.01) |
| H04W 28/06 | (2009.01) |
| H04L 1/00 | (2006.01) |
| H04W 72/12 | (2009.01) |
| H04W 4/06 | (2009.01) |
| H04L 5/00 | (2006.01) |
| H04W 72/08 | (2009.01) |

(52) U.S. Cl.
CPC ....... *H04W 28/0257* (2013.01); *H04L 1/0026* (2013.01); *H04L 5/0057* (2013.01); *H04W 4/06* (2013.01); *H04W 28/06* (2013.01); *H04W 72/1273* (2013.01); *H04W 72/08* (2013.01)

(58) Field of Classification Search
None
See application file for complete search history.

(56) References Cited

U.S. PATENT DOCUMENTS

| | | | |
|---|---|---|---|
| 2014/0192717 A1 | 7/2014 | Liu et al. | |
| 2015/0178769 A1* | 6/2015 | Mirisola | G06F 16/335 |
| | | | 705/14.45 |

FOREIGN PATENT DOCUMENTS

| | | |
|---|---|---|
| CN | 103581019 A | 2/2014 |
| CN | 104919758 A | 9/2015 |
| WO | 2017173134 A1 | 10/2017 |

OTHER PUBLICATIONS

Machine Translation and Abstract of Chinese Publication No. CN103581019, Feb. 12, 2014, 17 pages.
(Continued)

*Primary Examiner* — Clemence S Han
(74) *Attorney, Agent, or Firm* — Conley Rose, P.C.

(57) ABSTRACT

A method performed by a user equipment (UE) for enabling cross-layer receiver oriented dynamic multicast in cellular access. The method includes receiving an information-centric networking content-identifier (ICN-CID) from an application. The method generates a content medium access control identifier (CMAC-ID) using the ICN-CID. The CMAC-ID maps the ICN-CID to a medium access control (MAC) layer.

18 Claims, 10 Drawing Sheets

(56) References Cited

OTHER PUBLICATIONS

Foreign Communication From a Counterpart Application, PCT Application No. PCT/CN2019/076925, English Translation of International Search Report dated May 31, 2019, 5 pages.
Foreign Communication From a Counterpart Application, PCT Application No. PCT/CN2019/076925, English Translation of Written Opinion dated May 31, 2019, 4 pages.
Gomez-Barquero, et al., "Broadcast and Multicast Communication Enablers for the Fifth-Generation of Wireless Systems, Deliverable D5.1 Content Delivery Vision," Version v1.1, Nov. 30, 2017, 37 pages.

* cited by examiner

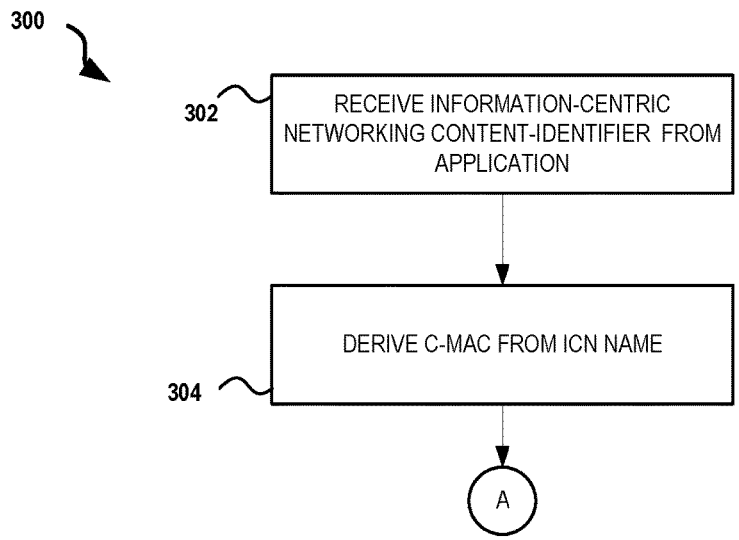
FIG. 3
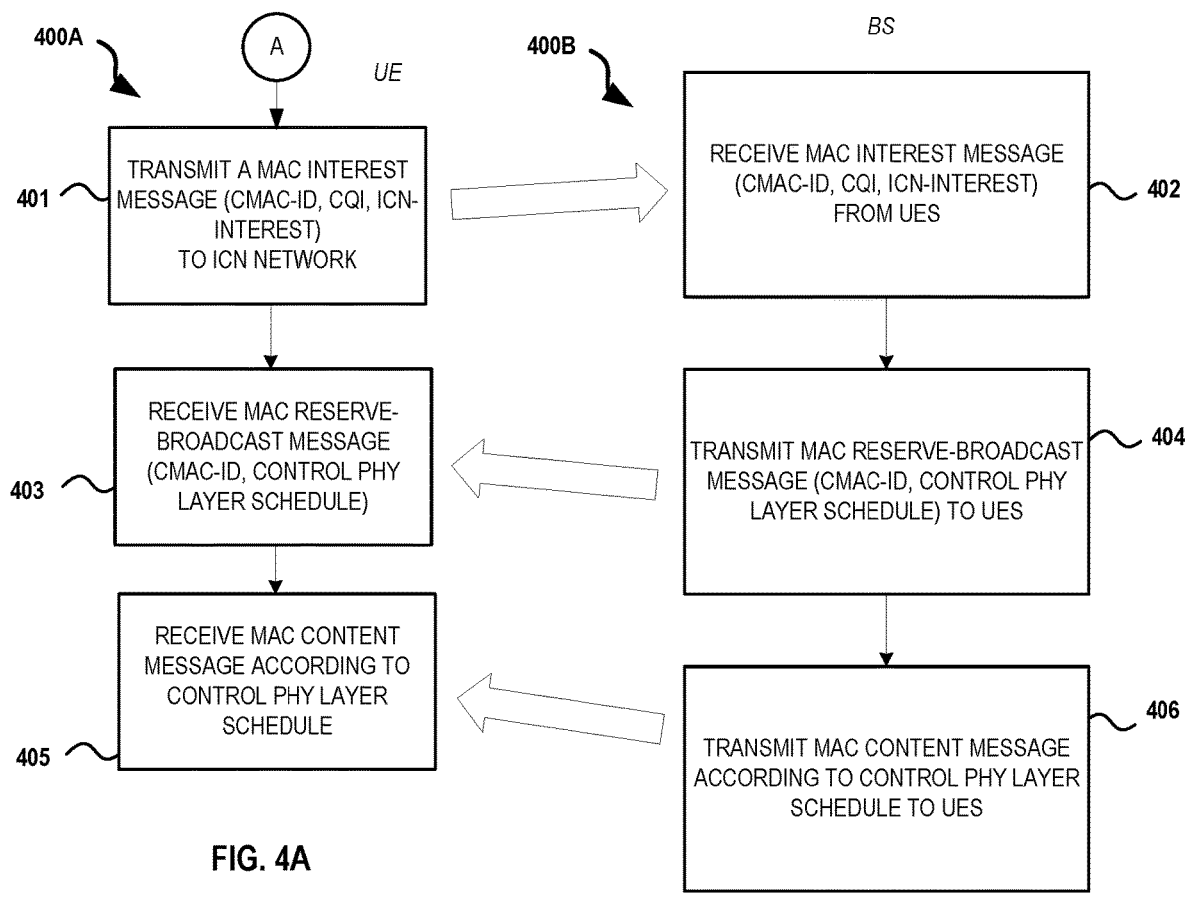
FIG. 4A
FIG. 4B

ENABLING CROSS-LAYER RECEIVER ORIENTED DYNAMIC MULTICAST IN CELLULAR ACCESS

CROSS-REFERENCE TO RELATED APPLICATIONS

This application claims priority to U.S. provisional patent application No. 62/639,665 filed on Mar. 7, 2018 titled "Enabling Cross-layer Receiver Oriented Dynamic Multicast in Cellular Access," which is incorporated by reference.

TECHNICAL FIELD

Embodiments of the present disclosure relate to the field of wireless communication, and in particular, to a method and an apparatus for enabling cross-layer receiver oriented dynamic multicast in cellular access.

BACKGROUND

Information-centric networking (ICN) is an approach to evolve the Internet infrastructure away from a host-centric paradigm based on perpetual connectivity and the end-to-end principle, to a network architecture in which the focal point is "named information" (content or data). Data becomes independent from location, application, storage, and means of transportation, enabling in-network caching and replication. ICN allows dynamic demand adaptation to aid content distribution, enabling popular content caching to be closer to users, e.g. at an evolved node B (eNodeB). eNodeB is a long term evolution (LTE) base station component. LTE is a fourth generation (4G) mobile communications standard. LTE Broadcast (LTE-B) is a single-frequency network (SFN) in broadcast mode that is part of the series of 3rd Generation Partnership Project (3GPP) LTE standards known and evolved as Multimedia Broadcast Multicast Service (eMBMS). LTE-B is supported for all defined bandwidths and formats of LTE.

SUMMARY

The disclosed embodiments propose various mechanisms to exploit ICN multicast in a wireless cellular network such as an LTE network.

According to a first aspect of the present disclosure, there is provided a method performed by a user equipment (UE) for enabling cross-layer receiver oriented dynamic multicast in cellular access. In one embodiment, the method includes receiving an information-centric networking content-identifier (ICN-CID) from an application; and generating a content medium access control identifier (CMAC-ID) using the ICN-CID, wherein the CMAC-ID maps the ICN-CID to a medium access control (MAC) layer.

Optionally, in the first aspect, the method may generate the CMAC-ID by mapping the ICN-CID to a dynamic multicast identifier (ID) or by performing a hash function using the ICN-CID.

Optionally, in the first aspect, the method may also include transmitting a MAC interest message to an ICN network, the MAC interest message comprising the CMAC-ID, a channel quality indicator (CQI), and an ICN interest payload; receiving from the ICN network a MAC reserve-broadcast message comprising the CMAC-ID and a control physical (PHY) layer schedule for receiving content response; and receiving from the ICN network a MAC content message comprising the CMAC-ID and ICN content data based on the control PHY layer schedule.

Optionally, in the first aspect, the method may also include determining a user equipment (UE) assigned downlink (DL) channel assignment schedule from the CMAC-ID; transmitting a MAC interest message to an ICN network, the MAC interest message comprising the CMAC-ID, a CQI, the UE assigned DL channel assignment schedule, and an ICN interest payload; and receiving, from the ICN network, a MAC content message comprising the CMAC-ID and ICN content data based on the UE assigned DL channel assignment schedule.

Optionally, in the first aspect, the method may also include determining a UE assigned DL channel assignment schedule from the CMAC-ID; transmitting an MAC interest message comprising the CMAC-ID, a CQI, UE assigned DL channel assignment schedule, and an ICN interest payload; receiving a reservation update MAC frame comprising the CMAC-ID and updated UE assigned DL channel assignment schedule; and receiving a MAC content message comprising the CMAC-ID and ICN content data based on the updated UE assigned DL channel assignment schedule.

Optionally, in the preceding aspect, the UE assigned DL channel assignment schedule may include a resource block root (RB_root) based on a maximum number of resource blocks (RBs) available for DL scheduling (Max_RB), wherein the RB_root is determined using a function that uses the CMAC-ID and the Max_RB; a resource block range (RB_range) based on the RB_root and a number of required RBs (RB_NUM), the RB_NUM determined based on information from an ICN layer indicating an expected size of a data response; and a next frame time indicting when the UE will listen for a response for a next sub-frame. In one aspect, the function for determining the RB_root also uses the CQI.

According to a second aspect of the present disclosure, there is provided a method performed by a base station device for enabling cross-layer receiver oriented dynamic multicast in cellular access. In one embodiment, the method includes receiving an medium access control (MAC) interest message from a user equipment (UE), the MAC interest message comprising a content medium access control identifier (CMAC-ID), a channel quality indicator (CQI), and an information-centric networking (ICN) interest payload; transmitting to the UE a MAC reserve-broadcast message comprising the CMAC-ID and a control physical (PHY) layer schedule for receiving content response; and transmitting to the UE a MAC content message comprising the CMAC-ID and ICN content data based on the control PHY layer schedule.

According to a third aspect of the present disclosure, there is provided a method performed by a base station device for enabling cross-layer receiver oriented dynamic multicast in cellular access. In one embodiment, the method includes receiving a medium access control (MAC) interest message comprising a content medium access control identifier (CMAC-ID), a channel quality indicator (CQI), a user equipment (UE) assigned downlink (DL) channel assignment schedule, and an information-centric networking (ICN) interest payload; determining whether a requested content is stored at the base station device; in response to a determination that the requested content is stored at the base station device: determining whether a scheduling conflict exists with the UE assigned DL channel assignment schedule; transmitting a MAC content message comprising the CMAC-ID and ICN content data based on the UE assigned DL channel assignment schedule in response to a determination that there is no scheduling conflict with the UE assigned DL channel assignment schedule; and transmitting a reservation update MAC frame comprising the CMAC-ID and an updated UE assigned DL channel assignment schedule in response to a determination that there is a scheduling conflict with the UE assigned DL channel assignment schedule, and transmitting the MAC content message comprising the CMAC-ID and ICN content data based on the updated UE assigned DL channel assignment schedule.

In the third aspect, if a determination that the requested content is not stored at the base station device, the method may also include transmitting, at a first next frame time indicated in the UE assigned DL channel assignment schedule, a reservation update MAC frame comprising the CMAC-ID and updated UE assigned DL channel assignment schedule; requesting the requested content from an ICN network; continuously transmitting a new reservation update MAC frame comprising the CMAC-ID and a newly updated UE assigned DL channel assignment schedule at a new updated next frame time indicated in the newly updated UE assigned DL channel assignment schedule until one of the requested content is received from the ICN network or a time threshold is met; in response to receiving the requested content from the ICN network, transmitting, at the new updated next frame time, the MAC content message comprising the CMAC-ID and ICN content data based on the updated UE assigned DL channel assignment schedule; and in response to not receiving the requested content from the ICN network within the time threshold is met, transmitting, at the new updated next frame time, a negative acknowledgment MAC frame indicating that the requested content cannot be retrieved.

According to a fourth aspect of the present disclosure, there is provided a user equipment comprising a memory configured to store computer-executable instructions, that when executed by the processor cause the processor to: receive a content-name from an application; and generate a content medium access control identifier (CMAC-ID) using the content-name, wherein the CMAC-ID maps the content-name to a medium access control (MAC) layer.

In the fourth aspect, the processor may be further configured to execute the computer-executable instructions to: transmit a MAC interest message to an information-centric networking (ICN) network, the MAC interest message comprising the CMAC-ID, a channel quality indicator (CQI), and an ICN interest payload; receive from the ICN network a MAC reserve-broadcast message comprising the CMAC-ID and a control physical (PHY) layer schedule for receiving content response; and receive from the ICN network a MAC content message comprising the CMAC-ID and ICN content data based on the control PHY layer schedule.

Optionally, in the fourth aspect, the processor may be further configured to execute the computer-executable instructions to: determine a user equipment (UE) assigned downlink (DL) channel assignment schedule from the CMAC-ID; transmit a MAC interest message to an ICN network, the MAC interest message comprising the CMAC-ID, a CQI, the UE assigned DL channel assignment schedule, and an ICN interest payload; and receive from the ICN network a MAC content message comprising the CMAC-ID and ICN content data based on the UE assigned DL channel assignment schedule.

Optionally, in the fourth aspect, the processor may be further configured to execute the computer-executable instructions to: determine a UE assigned DL channel assignment schedule from the CMAC-ID; transmit an MAC interest message comprising the CMAC-ID, a CQI, UE assigned DL channel assignment schedule, and an ICN interest payload; receive a reservation update MAC frame comprising the CMAC-ID and updated UE assigned DL channel assignment schedule; and receive a MAC content message comprising the CMAC-ID and ICN content data based on the updated UE assigned DL channel assignment schedule.

Optionally, in the fourth aspect, generating the CMAC-ID may include mapping the content-name to a dynamic multicast identifier (ID) or performing a hash function using the content-name.

According to a fifth aspect of the present disclosure, there is provided a base station device for enabling cross-layer receiver oriented dynamic multicast in cellular access, the base station device comprising a memory configured to store computer-executable instructions, that when executed by the processor cause the processor to: receive a medium access control (MAC) interest message from a user equipment (UE), the MAC interest message comprising a content medium access control identifier (CMAC-ID), a channel quality indicator (CQI), and an information-centric networking content-identifier (ICN-CID) interest payload; transmit to the UE a MAC reserve-broadcast message comprising the CMAC-ID and a control physical (PHY) layer schedule for receiving content response; and transmit to the UE a MAC content message comprising the CMAC-ID and ICN content data based on the control PHY layer schedule.

According to a sixth aspect of the present disclosure, there is provided a base station device for enabling cross-layer receiver oriented dynamic multicast in cellular access, the base station device comprising a memory configured to store computer-executable instructions, that when executed by the processor cause the processor to: receive a medium access control (MAC) interest message comprising a content medium access control identifier (CMAC-ID), a channel quality indicator (CQI), a user equipment (UE) assigned downlink (DL) channel assignment schedule, and an information-centric networking (ICN) interest payload; determine whether a requested content is stored at the base station device; in response to a determination that the requested content is stored at the base station device: determine whether a scheduling conflict exist with the UE assigned DL channel assignment schedule; transmit a MAC content message comprising the CMAC-ID and ICN content data based on the UE assigned DL channel assignment schedule in response to a determination that there is no scheduling conflict with the UE assigned DL channel assignment schedule; and transmit a reservation update MAC frame comprising the CMAC-ID and an updated UE assigned DL channel assignment schedule in response to a determination that there is a scheduling conflict with the UE assigned DL channel assignment schedule, and transmitting the MAC content message comprising the CMAC-ID and ICN content data based on the updated UE assigned DL channel assignment schedule.

Optionally, in the sixth aspect, the processor is further configured to execute the computer-executable instructions to: in response to a determination that the requested content is not stored at the base station device: transmit, at a first next frame time indicated in the UE assigned DL channel assignment schedule, a reservation update MAC frame comprising the CMAC-ID and updated UE assigned DL channel assignment schedule; request the requested content from an ICN network; continuously transmit a new reservation update MAC frame comprising the CMAC-ID and a newly updated UE assigned DL channel assignment schedule at a new updated next frame time indicated in the newly updated UE assigned DL channel assignment schedule until one of the requested content is received from the ICN network or a time threshold is met; in response to receiving the requested content from the ICN network, transmit, at the new updated next frame time, the MAC content message comprising the CMAC-ID and ICN content data based on the updated UE assigned DL channel assignment schedule; and in response to not receiving the requested content from the ICN network within the time threshold is met, transmit, at the new updated next frame time, a negative acknowledgment MAC frame indicating that the requested content cannot be retrieved.

It should be understood that embodiments of this disclosure may further include all combinations of the items discussed in the detailed description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a flow diagram illustrating an example of a method performed by a user equipment (UE) for enabling cross-layer receiver oriented dynamic multicast in cellular access in accordance with an embodiment.

FIGS. 4A and 4B are flow diagrams illustrating an example of a BS driven scheduling methods for enabling cross-layer receiver oriented dynamic multicast in cellular access in accordance with an embodiment.

Figure 1:
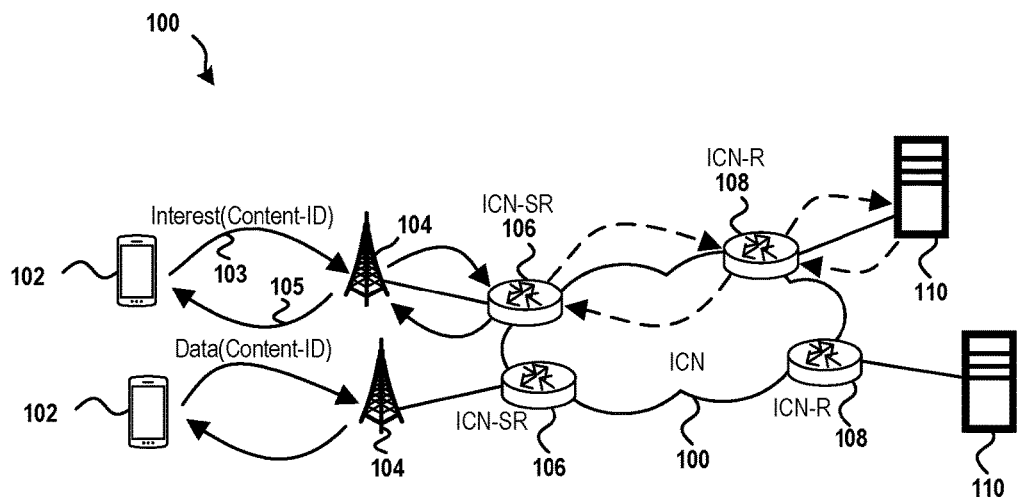
FIG. 1 is a schematic diagram illustrating an example of an ICN network in accordance with an embodiment.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

Broadcast/multicast in wireless access improves spectrum utilization significantly. LTE-B extensions were proposed to enable multicasting in LTE. However, LTE-B has not been a commercial success due to several factors including (1) user behavior moving to video on demand (VoD) based services; (2) pre-provisioned broadcast spectrum resources were under-utilized; (3) the current proposal could not work at the time scale of on-demand content multicast requirements; (4) provisioning multicast cast access resources incurs latency because of control and data channel setup latency, which will increase end-to-end content delivery time significantly; (5) no Internet Protocol (IP) multicast in the core (e.g., Evolved Packet Core (EPC)); (6) scheduling challenges such as choosing the right mobile switching center (MSC) that meets diverse user requirements, e.g., cell edge vs mobile vs static users; and (7) new hardware capability because of new user plane (UP) and/or control plane (CP). In summary, the current multicast solution is only suitable for events that are well known in advance, and require specialized UP/CP to handle radio resource scheduling.

Accordingly, the disclosed embodiments provide methods and apparatus for enabling cross-layer receiver oriented dynamic multicast in cellular access. In particular, the disclosed embodiments integrate ICN with the medium access control (MAC) and physical (PHY) layers to enable a single transmission. In one embodiment, ICN interest packets may carry wireless parameters in its requests, e.g., channel quality indicator (CQI), which enables cross-layer adaptation. Advantages of the disclosed embodiments include improving spectrum utilization by enabling unicast and multicast to share the same control and data channel without any special provisions to support multicast. Thus, unicast and multicast transmissions become indistinguishable.

FIG. 1 is a schematic diagram illustrating an example of an ICN network 100 in accordance with an embodiment. The ICN network 100 enables one or more UEs 102 such as, but not limited to, a smartphone or other network accessible device, to request content by its name or identifier (ID) irrespective of its storage location. For example, a UE 102 may transmit an interest message 103 with a content-ID to request the content associated with the content-ID to a base station (BS) 104 such as, but not limited to, an eNodeB. The BS 104 in turn communicates with an ICN service router (ICN-SR) 106 to request the content if the requested content is not locally cached/stored at the receiving BS 104. The ICN-SR 106 may route the request to a content provider 110 via one or more ICN routers (ICN-R) 108 using a forwarding information table at each of the ICN-R 108. The content provider 110 returns the content to the ICN-SR 106 via the one or more ICN-Rs 108, which routes it back to the BS 104, and ultimately back to the UE 102 via data message 105. Each of the ICN-R 108 may store a pending interest table that contains return route state for outstanding requests. The BS 104, ICN-SR 106, and ICN-R 108 may store the data in a content store (i.e., cache the data in memory) to satisfy potential future requests for the same content without having to retrieve the content from the content provider 110, thus improving packet delivery performance.

Figure 2:
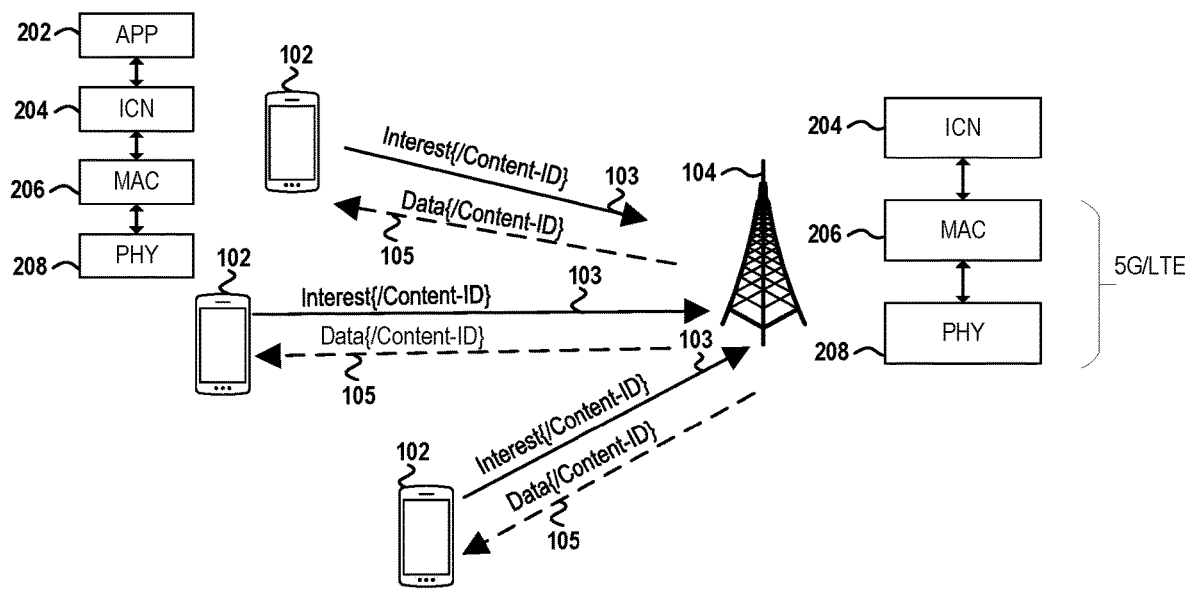
FIG. 2 is a schematic diagram illustrating an example of a content request in an ICN network in accordance with an embodiment.

FIG. 2 is a schematic diagram illustrating an example of a content request in an ICN network in accordance with an embodiment. Using an application in an application (APP) layer 202 of the UE 102, a user may request content by specifying a content name or content-ID, which is then passed through an ICN layer 204, a medium access control (MAC) layer 206, and then a physical (PHY) layer 208 of the UE 102. For example, a user may request /home/videos/trainingvideo.mpg via an application on the UE 102. The APP layer 202 provides the user interface responsible for displaying received information to the user and for enabling a user to input information. The ICN layer 204 may be configured to provide such functionality as consumer to producer connectivity, security, data transport or exchange, and session logic in ICN network. The MAC layer 206, which may also be referred to as a data link layer, provides addressing and channel access control mechanisms that enable the UE 102 to communicate with the BS hence enabling communication with other network nodes in a network. The PHY layer 208 defines the means of transmitting raw bits over a physical data link connecting network nodes.

In the depicted embodiment, an interest message 103 containing the content-ID is transmitted to a BS 104 from the UE 102. The BS 104 similarly processes the interest message 103 through the PHY layer 208, the MAC layer 206, and the ICN layer 204. The BS 104 may also receive additional interest messages 103 from other UEs 102 that request that same content. As shown in FIG. 2, the BS 104 transmits to each of the UE 102 requesting the same content a separate data message 104 that includes the content-ID and a content payload to satisfy the content request. To improve spectrum utilization significantly, the disclosed embodiments seek to integrate the ICN layer 204 with MAC layer 206 and PHY layer 208 so that a single transmission from the BS 104 would satisfy the content requests of each of the UEs requesting the same content.

To this end, FIG. 3 is a flow diagram illustrating an example of a method 300 performed by a UE, such as UE 102, for enabling cross-layer receiver oriented dynamic multicast in cellular access to improve efficiency in accordance with an embodiment. The method 300 begins, at step 302, by receiving an ICN content-ID (ICN-CID) from an application running on the UE. At step 304, the method 300 generates a content medium access control identifier (CMAC-ID) using the ICN-CID. The CMAC-ID maps the ICN-CID to a MAC layer to permit the MAC layer to operate in an ICN manner that enables both unicast and multicast to share the same control and data channel without any special functions to support multicast. In various embodiments, the CMAC-ID may also be generated by mapping the ICN-CID to a dynamic multicast ID.

Multiple approaches may be utilized to derive the CMAC-ID from the ICN-CID. For example, the CMAC-ID may be stored in a manifest provided by the content producer or may generated by performing a hash function using the ICN-CID. Additionally, the disclosed embodiments may utilize various approaches for handling CMAC-ID collisions at the ICN level. For example, in one embodiment, physical isolation of the hash CMAC-ID based on name space may be used. For instance, several optimizing techniques may be used to map ICN-CID to a unique hash ID to minimize collision. In addition, because ICN-CID are contextual, different hash functions may be used, or one or multiple components may be used as an input to the hash function to physically separate the hash space. In another embodiment, hash collisions may also be handled at the BS/eNodeB by applying brute force. For example, in one embodiment, if two different ICN-CIDs map to the same Hash ID, the ICN layer of the BS may inform the MAC layer of the collision. The MAC layer may then generate two different CMAC-ID multicast IDs, and this mapping may be sent in the next frame time instance determined by the UEs for the two content-IDs. The UEs can then re-request the content with the new CMAC-ID multicast IDs.

FIGS. 4A and 4B are flow diagrams illustrating an example of BS driven scheduling methods for enabling cross-layer receiver oriented dynamic multicast in cellular access in accordance with an embodiment. In particular, FIG. 4A illustrates a method 400A performed by a UE, and FIG. 4B illustrates a corresponding method 400B performed by a BS such as, but not limited to, an eNodeB. Beginning with FIG. 4A, the method 400A starts, at step 401, by transmitting a MAC interest message to an ICN network. In one embodiment, the MAC interest message includes a CMAC-ID, a channel quality indicator (CQI), and an ICN interest payload. The CMAC-ID is generated using the requested content name as described in FIG. 3. The CQI is an indicator that indicates a quality level of a communication channel. The ICN interest payload may include data, instructions, or configuration information that network routers can use to manipulate or configure one or more local resource. In response to the MAC interest message, the method 400A, at step 403, receives from the ICN network a MAC reserve-broadcast message that includes the CMAC-ID and a control PHY layer schedule for receiving a content response. The method 400A, at step 405, receives from the ICN network a MAC content message that includes the CMAC-ID and ICN content data based on the control PHY layer schedule.

Referring now to FIG. 4B, in the corresponding method performed by a BS, the method 400B, at step 402, receives the MAC interest message from a UE. As stated above, the MAC interest message includes a CMAC-ID, a CQI, and an ICN interest payload. Although not depicted in FIG. 4B, the BS may also receive a MAC interest message with the same CMAC-ID from other UEs during a particular time period. To enable a single multicast transmission to all the UEs requesting the same content, the BS, at step 404, is configured to transmit to the UEs a MAC reserve-broadcast message that includes the CMAC-ID and a control PHY layer schedule for receiving a content response. The BS, at step 406, is then configured to transmit to the UE a MAC content message that includes the CMAC-ID and ICN content data based on the control PHY layer schedule contained in the MAC reserve-broadcast message.

As shown above, the method 400B requires that broadcast channel resources be reserved prior to multicasting the MAC content message to the UEs. This process may lead to a waste of resources and it forces all UEs to process information that may not be relevant to them. Additionally, there is at least a one-half (½) round-trip time (RTT) delay between the time the MAC reserve-broadcast message is transmitted and the MAC content message. This mode of scheduling is also not efficient where popular content may be cached or stored at the BS. Thus, the alternative subsequent embodiments seek to address one or more of these issues by using distributed scheduling so that UEs requesting the same content use the same PHY resource to receive the requested content.

Figure 5:
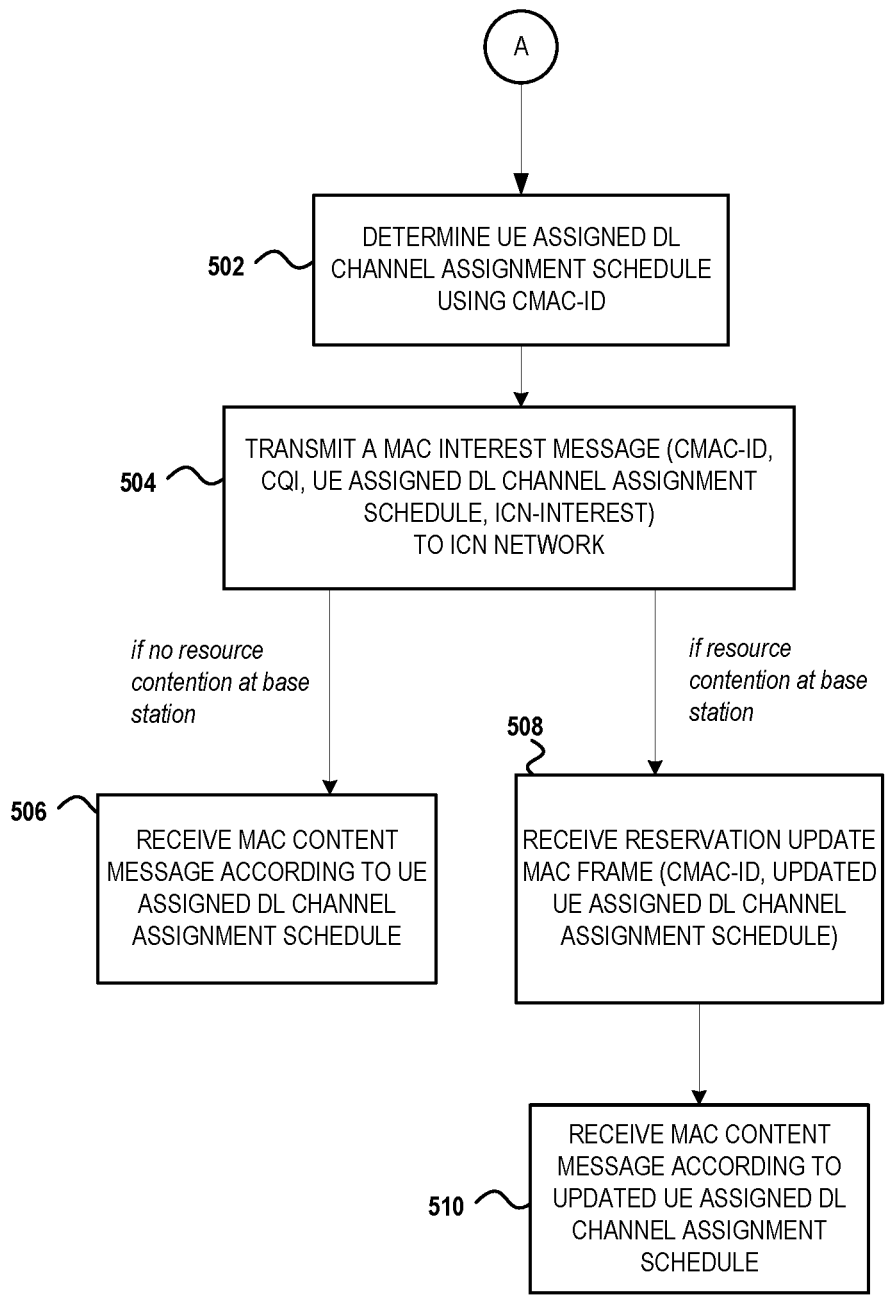
FIG. 5 is a flow diagram illustrating a UE driven scheduling method performed by a UE for enabling cross-layer receiver oriented dynamic multicast in cellular access in accordance with an embodiment.

As an example, FIG. 5 is a flow diagram illustrating a UE driven scheduling method 500 performed by a UE for enabling cross-layer receiver oriented dynamic multicast in cellular access in accordance with an embodiment. The UE driven scheduling method 500 does not require that the BS broadcast a MAC reserve-broadcast message to all UEs. Instead, the UE driven scheduling method 500 begins, at step 502, by determining a UE assigned DL channel assignment schedule using the CMAC-ID generated in FIG. 3. The UE assigned DL channel assignment schedule specifies timing and resource blocks for transmitting a response to the request back to the UE.

At step 504, the UE driven scheduling method 500 transmits a MAC interest message to an ICN network. In one embodiment, the MAC interest message includes the CMAC-ID, a CQI, the UE assigned DL channel assignment schedule, and an ICN interest payload. If the BS receiving the MAC interest message determines that it does not have any resource contention with the UE assigned DL channel assignment schedule, as described below in FIG. 6, the UE driven scheduling method 500, at step 506, receives from the ICN network, based on the UE assigned DL channel assignment schedule, a MAC content message that includes the CMAC-ID and the requested ICN content data. A resource contention occurs when more than one UEs request use of the same resource such as a resource block of a transmission frame. If the BS receiving the MAC interest message determines that there is a resource contention with the UE assigned DL channel assignment schedule, then the UE driven scheduling method 500, at step 508, receives from the BS at the next frame time specified in the UE assigned DL channel assignment schedule, a reservation update MAC frame. In one embodiment, the reservation update MAC frame includes the CMAC-ID and updated UE assigned DL channel assignment schedule. The updated UE assigned DL channel assignment schedule includes a new next frame time that the UE will receive a response from the BS. At step 510, the UE driven scheduling method 500 receives, according to the updated UE assigned DL channel assignment schedule, a MAC content message that includes the CMAC-ID and the requested ICN content data.

Figure 6:
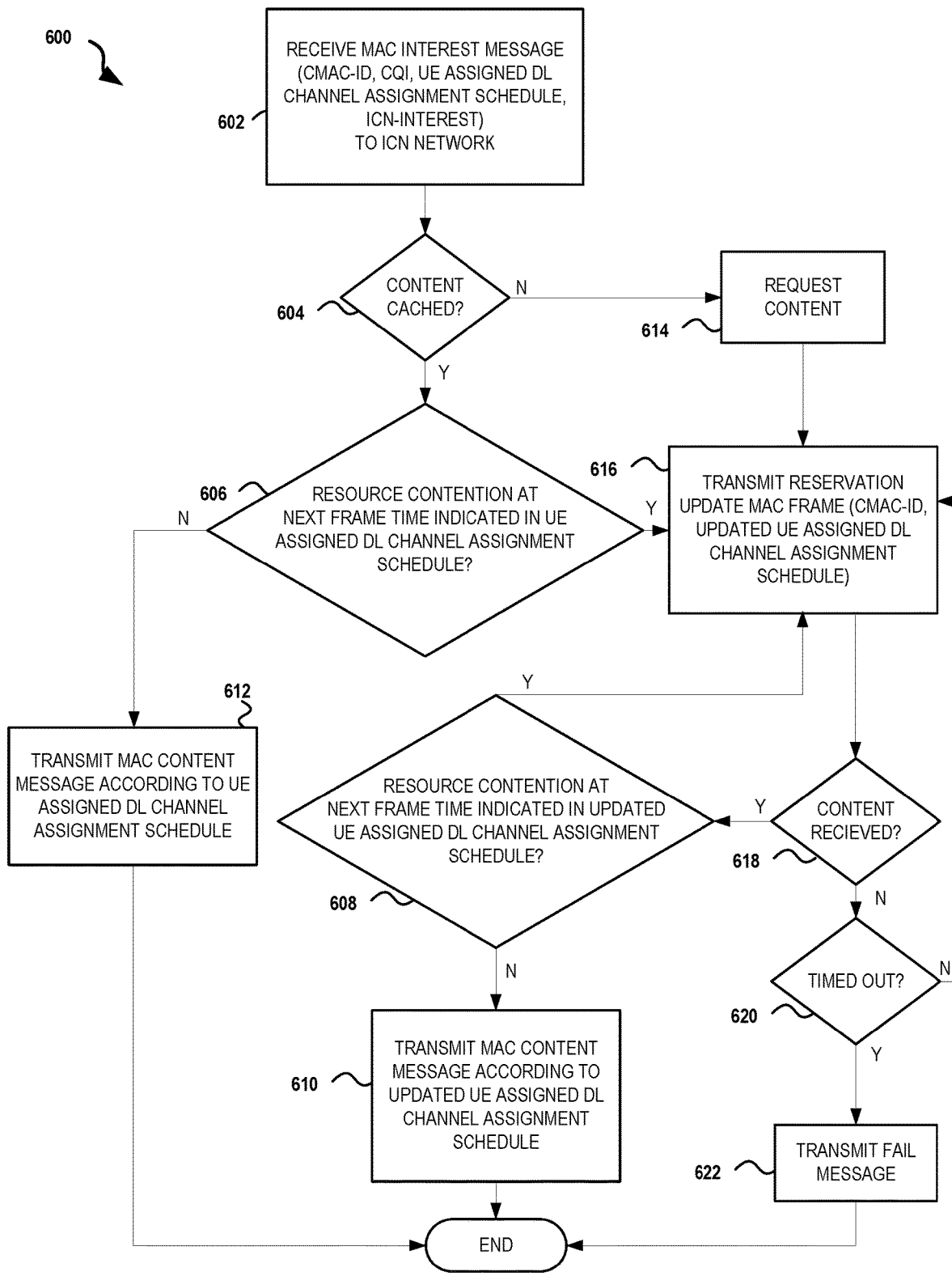
FIG. 6 is a flow diagram illustrating a UE driven scheduling method performed by a BS for enabling cross-layer receiver oriented dynamic multicast in cellular access in accordance with an embodiment.

FIG. 6 is a flow diagram illustrating a UE driven scheduling method 600 for enabling cross-layer receiver oriented dynamic multicast in cellular access in accordance with an embodiment. The UE driven scheduling method 600 is performed by a BS of an ICN network, and corresponds to the UE driven scheduling method 500 performed by a UE in FIG. 5. The UE driven scheduling method 600 begins at step 602 by receiving, from a UE, a MAC interest message that includes a CMAC-ID, a CQI, a UE assigned DL channel assignment schedule, and an ICN interest payload. At step 604, the UE driven scheduling method 600 determines whether the requested content is cached in the content store at the BS. If the UE driven scheduling method 600 determines that the requested content is cached in the content store at the BS, the UE driven scheduling method 600, at step 606, determines whether there is a resource contention with the UE assigned DL channel assignment schedule. If the UE driven scheduling method 600 determines that there is no resource contention with the UE assigned DL channel assignment schedule, the UE driven scheduling method 600, at step 612, transmits, according to the UE assigned DL channel assignment schedule, a MAC content message that includes the CMAC-ID and ICN content data, with UE driven scheduling method 600 terminating thereafter.

Returning to step 604, if the UE driven scheduling method 600 determines that the requested content is not cached in the content store at the BS, the UE driven scheduling method 600, at step 614, transmits a request for the requested content to a content provider, another base station, and/or ICN router for the requested content. If the requested content has not been received at the next frame time specified in the UE assigned DL channel assignment schedule, the UE driven scheduling method 600, at step 616, transmits a reservation update MAC frame that includes the CMAC-ID and an updated UE assigned DL channel assignment schedule. The UE driven scheduling method 600 continues to wait for the requested content at step 618. If the UE driven scheduling method 600, at step 620, determines that the requested content has not been received within a specified time period, the UE driven scheduling method 600 may time out the request and transmit a fail message. For example, in one embodiment, the UE driven scheduling method 600 may transmit a negative-acknowledgement (NAK or NACK) message, at step 622, to indicate an error in providing the requested content, with UE driven scheduling method 600 terminating thereafter. If the UE driven scheduling method 600, at step 620, determines that the request for the requested content has not timed out, the UE driven scheduling method 600 returns to step 616 and transmits, at a next frame time, a reservation update MAC frame. In one embodiment, the reservation update MAC frame may include the CMAC-ID and a new updated UE assigned DL channel assignment schedule.

Returning the step 618, if the UE driven scheduling method 600 receives the requested content, the UE driven scheduling method 600, at step 608, determines whether there is a resource contention at the next frame time indicated in the updated UE assigned DL channel assignment schedule. If the UE driven scheduling method 600 determines that there is a resource contention at the next predicted frame time indicated in the updated UE assigned DL channel assignment schedule, the UE driven scheduling method 600 returns to step 616 and transmits, at the next frame time, a reservation update MAC frame that includes the CMAC-ID and a new updated UE assigned DL channel assignment schedule. Once the UE driven scheduling method 600, at step 608, determines that there is no resource contention, the UE driven scheduling method 600 proceeds to step 610. At step 610, the UE driven scheduling method 600 transmits, at the new updated next frame time indicated in the updated UE assigned DL channel assignment schedule, the MAC content message comprising the CMAC-ID and ICN content data. The UE driven scheduling method 600 terminates thereafter.

Figure 7:
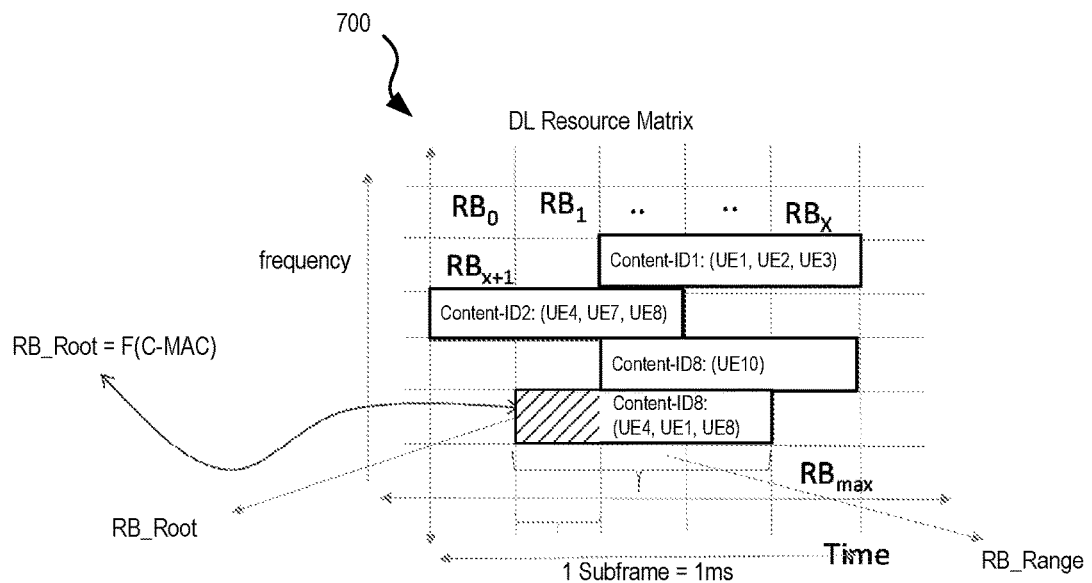
FIG. 7 is a schematic diagram illustrating an example of a downlink (DL) resource matrix for enabling cross-layer receiver oriented dynamic multicast in cellular access in accordance with an embodiment.

FIG. 7 is a schematic diagram illustrating an example of a DL resource matrix 700 for enabling cross-layer receiver oriented dynamic multicast in cellular access in accordance with an embodiment. The DL resource matrix 700 may be part of an LTE frame structure (i.e., a sub-frame of the LTE frame). The DL resource matrix 700 includes a plurality of resource blocks (Rb0, Rb1, . . . . RBmax) that may be used for scheduling transmission. A resource block (RB) is the smallest unit of resources that can be allocated to a user. For LTE, each resource block is 180 kilohertz (kHz) wide in frequency and 1 slot long (0.5 milliseconds (ms)) in time. For a normal cyclic prefix (CP), each RB is made up of 84 resource elements (REs). For extended CP, each RB is made up of 72 REs. A RE is the smallest defined unit and contains a single complex value representing data from a physical channel or signal.

As described above in FIGS. 4A-B and 5, one goal of the disclosed embodiments is to use distributed scheduling, instead of traditional centralized scheduling to handle dynamic multicast. By using distributed scheduling in the manner described herein, all UEs asking for the same content in a sub-frame time window (e.g., 1 ms for LTE) can be scheduled on a single transmission slot. As described in FIG. 5, the C-MAC is used to derive DL scheduling resources for determining the UE assigned DL channel assignment schedule. In determining the UE assigned DL channel assignment schedule, a UE may be configured to determine a RB_ROOT variable and RB_RANGE variable as illustrated in FIG. 7 and as further described below. The depicted embodiment illustrates an ideal case of orthogonal scheduling by the UE. If other UEs are requesting the same content, each UE that is requesting the same content will calculate the same value for the RB_ROOT variable and RB_RANGE variable.

In one embodiment, to map the CMAC-ID to a RB, the RB_ROOT variable is first determined based on the maximum number RBs (MAX_RB) available for DL scheduling. In one embodiment, UEs and the BS/eNodeB agree on a common index map of the RBs within a sub-frame. In one embodiment, for 1 gigahertz (GHZ) spectrum, MAX_RB could be 5000 RB, or 500,000 REs. The MAX_RB is a function of a subcarrier spacing and symbol duration. In one embodiment, if the CMAC-ID is a random ID, then RB_ROOT=(CMAC-ID) % MAX_RB. An objective of the disclosed embodiments is to evenly disperse the RB_ROOT for each of the requested content within the sub-frame to minimize resource collision. A collision occurs if a content request for a differing content has selected the same RB. The % operator is a modulo (MOD) operator that determines the remainder after division of one number (e.g., CMAC-ID) by another (e.g., MAX_RB).

Second, a number of RB (RB_NUM) required is determined based on the estimation of the expected MTU (Maximum Transmission Unit) size and the CQI of the UE. The CQI is used to identify the modulation and coding scheme (MCS) that the UE can receive data at. For example, for LTE, CQI of 15 could use 256 quadrature amplitude modulation (QAM) (e.g., 8 bits/symbol/RE). In one embodiment, the RB_NUM=(Expected MTU)/(bits_per_RB or bits_per_RE). In certain embodiments, when coding overhead is involved, that overhead (i.e., space required for coding) is accounted for in RB_NUM.

Third, a next frame time (NextFrameTime) is determined. NextFrameTime is the next LTE sub-frame when the UE will listen for a response from the BS. In one embodiment, the NextFrameTime is determined based on whether the requested content is cached/stored in the BS. For example, in one embodiment, the NextFrameTime is a function of the estimated RTT and the delay considering ICN/MAC/PHY layers processing time (NextFrameTime=CurrentFrameTime+Rounded_NextSubFrameTime(Estimated_RTT)). The UEs requesting content within the same sub-frame will converge on the same NextFrameTime. This may be true for static users within a cell or localized mobile users. In some embodiments, NextFrameTime may consider the case when interests (i.e., content requests) are spaced from multiple UEs within a sub-frame. The NextFrameTime may also be invariant to UE request time to ensure consensus on multicast schedule. In certain embodiments, depending on the channel capacity and traffic characteristics, there may be significant collision on the RB resource selected by the UEs for different content-IDs/content names. As described above in FIG. 6, the BS will determine and resolve any resource contention (i.e., collision of the RB resource selected by the UEs for different content-IDs/content names) by transmitting an updated UE assigned DL channel assignment schedule.

Figure 8:
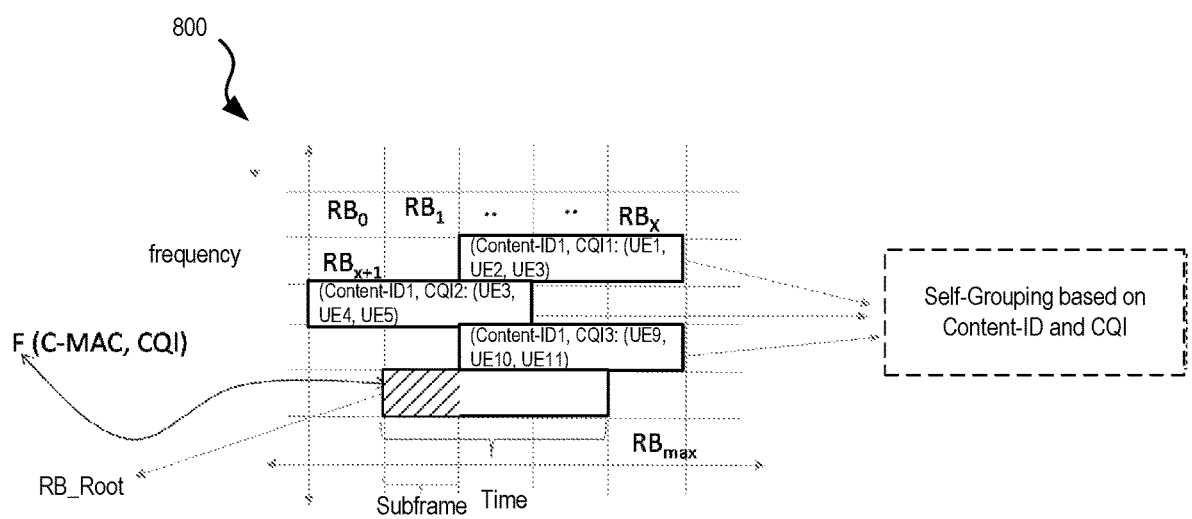
FIG. 8 is a schematic diagram illustrating another example of a DL resource matrix for enabling cross-layer receiver oriented dynamic multicast in cellular access in accordance with an embodiment.

FIG. 8 is a schematic diagram illustrating another example of a DL resource matrix 800 for enabling cross-layer receiver oriented dynamic multicast in cellular access in accordance with an embodiment. The DL resource matrix 800 illustrates dynamic self-grouping, where the mapping from the CMAC-ID to a RB also takes into account the CQI to enable self-grouping. This embodiment may be useful as static users will enjoy better CQIs than mobile ones. This may be important because different groups of UEs may have different radio conditions. One goal of this embodiment is to achieve physical separation in the allocation of the physical resource among the group of UEs with different CQIs. As an example, RB_ROOT=(f(CMAC-ID, CQI) % MAX_RB) and RB_RANGE=f(amount of estimated CO).

Figure 9:
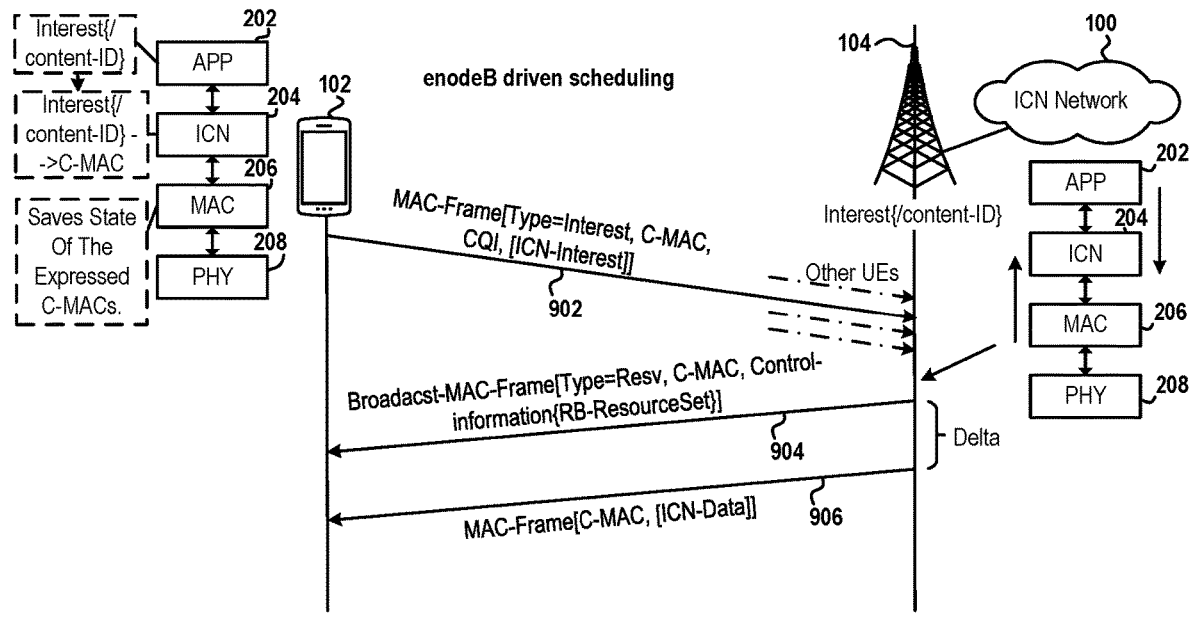
FIG. 9 is a schematic diagram illustrating an example of a BS driven scheduling method for enabling cross-layer receiver oriented dynamic multicast in cellular access in accordance with an embodiment.

FIG. 9 is a schematic diagram illustrating an example of a BS driven scheduling method for enabling cross-layer receiver oriented dynamic multicast in cellular access in accordance with an embodiment. As illustrated in FIG. 9, the UE 102 receives an interest request 902 for a particular content name (content-ID) at the APP layer 202, which is passed to the ICN layer 204, where the content-ID is used to generate a CMAC-ID. In one embodiment, the MAC layer saves the state of the expressed CMAC-IDs. The UE 102 transmits a MAC interest message 902 (CMAC-ID, CQI, ICN-Interest) to a BS 104 of the ICN network 100. The BS 104 receives the MAC interest message 902 from the UE 102 along with the MAC interest messages from other UEs. The BS 104 processes the received messages in the reverse order through the PHY layer 208, MAC layer 206, ICN layer 204, and the APP layer 202. The BS 104 transmits to the UEs 102 a MAC reserve-broadcast message 904 that includes the CMAC-ID and a control PHY layer schedule for receiving content response. After a delay (e.g., ½ RTT+Delta delay), the BS 104 transmits to the UEs a MAC content message 906 that includes the CMAC-ID and ICN content data based on the control PHY layer schedule contained in the MAC reserve-broadcast message 904.

Figure 10:
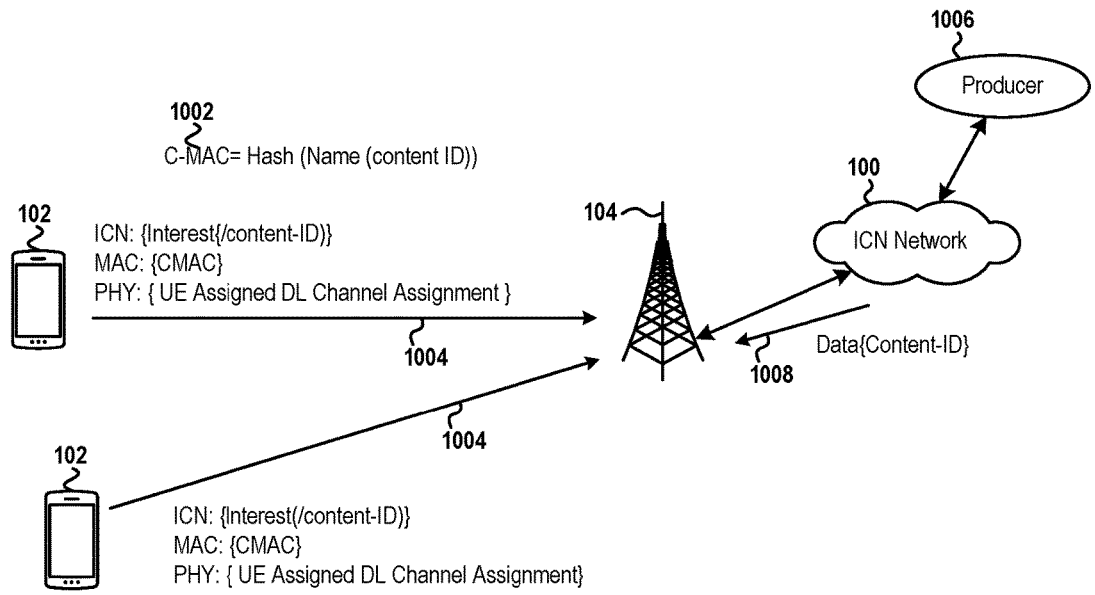
FIG. 10 is a schematic diagram illustrating an example of a UE driven scheduling method for enabling cross-layer receiver oriented dynamic multicast in cellular access in accordance with an embodiment.

FIG. 10 is a schematic diagram illustrating an example of a UE driven scheduling method for enabling cross-layer receiver oriented dynamic multicast in cellular access in accordance with an embodiment. In the depicted embodiment, one or more UEs 102 generate a CMAC-ID 1002 by hashing the content-ID. The UEs 102 pass the content-ID for the ICN layer, the CMAC-ID for the MAC layer, and a UE 102 assigned DL channel assignment schedule for the PHY layer in an interest message 1004 to the BS 104. The UE 102 assigned DL channel assignment schedule is determined by the UE 102 using the CMAC-ID as described above. The BS/enodeB 104 checks for any resource contention. If there is a resource contention, it reschedules the DL assignment, otherwise it sends data 1008 to the UEs 102 at the UEs 102 chosen time/frequency resources specified in the UE 102 assigned DL channel assignment schedule. The data 1008 may be retrieved by the BS 104 from a content producer (producer 1006) via the ICN network 100.

Figure 11:
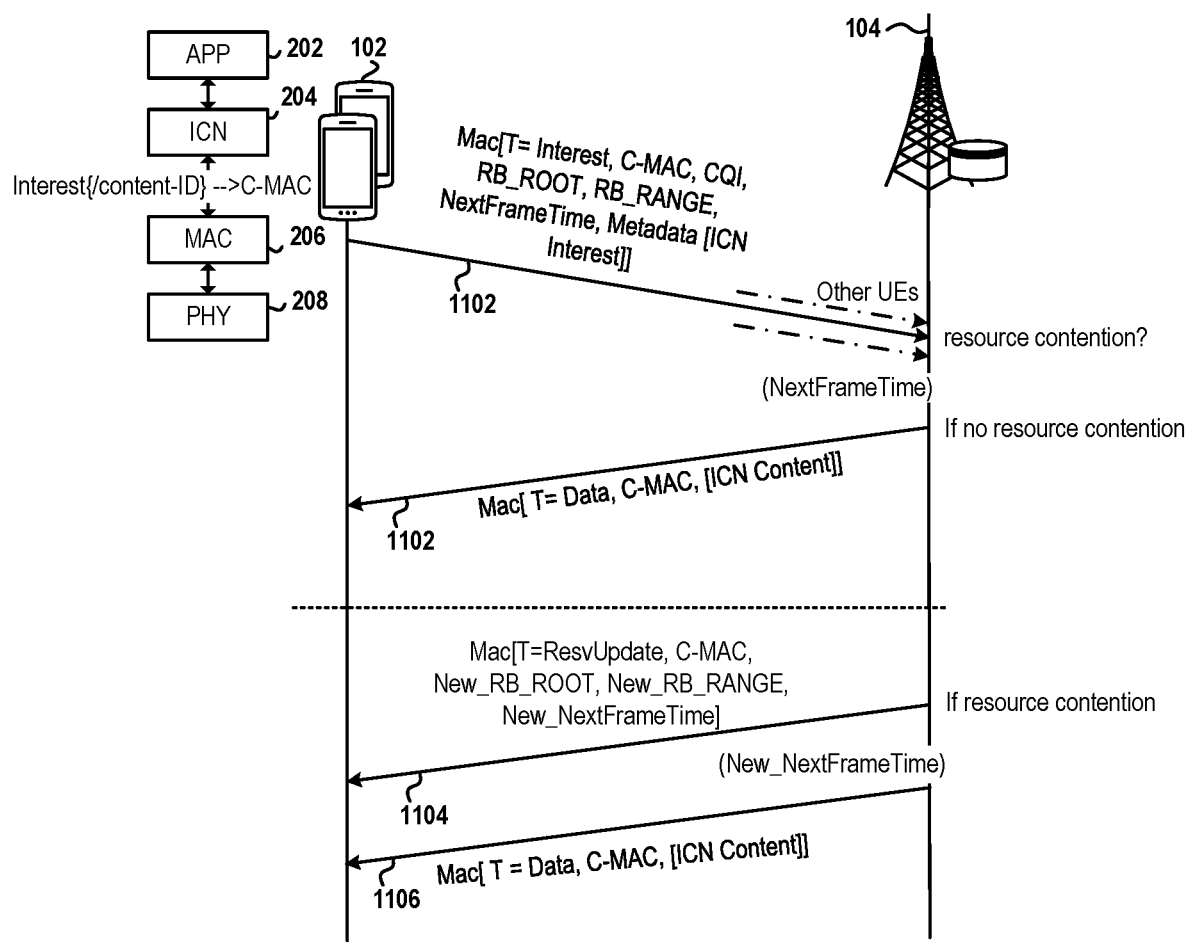
FIG. 11 is a schematic diagram illustrating an example of a protocol between one or more UEs and a BS having content cached at the BS for enabling cross-layer receiver oriented dynamic multicast in cellular access in accordance with an embodiment.

FIG. 11 is a schematic diagram illustrating an example of a protocol between one or more UEs 102 and a BS 104 having content cached at the BS 104 for enabling cross-layer receiver oriented dynamic multicast in cellular access in accordance with an embodiment. In the depicted embodiment, the UE 102 determines a CMAC-ID, RB-Root, RB_RANGE, CQI, and NextFrameTime, and transmits this information in a MAC interest message 1102 to the BS 104. The UE 102 saves the state of the CMAC-ID in the MAC layer 206. The BS 104 may receive numerous MAC interest messages 1102 from other UEs 102 as well. In response to receiving the MAC interest message 1102, the BS 104 determines whether there is a collision/resource contention with the UE 102 calculated RB_ROOT and RB_Range with the RB_ROOT and RB_Range from other UEs 102. If there is no resource contention, at the UE 102's NextFrameTime, the BS 104 saves the state in the MAC Layer 206. Because the content is cached in an ICN layer 204, the BS 104 responds by transmitting a MAC content message 1104 that includes the CMAC-ID and the requested ICN content data.

If there is a collision, at the UE 102's NextFrameTime, the BS 104 responds with MAC NACK message 1104, suggesting a New_RB_Root and New_RB_Range and New_NextFrameTime. In one embodiment, this response may be transmitted over a pre-determined channel using the Metadata. At the New_NextFrameTime, the BS 104 responds by transmitting a MAC content message 1106 that includes the CMAC-ID and the requested ICN content data.

Figure 12:
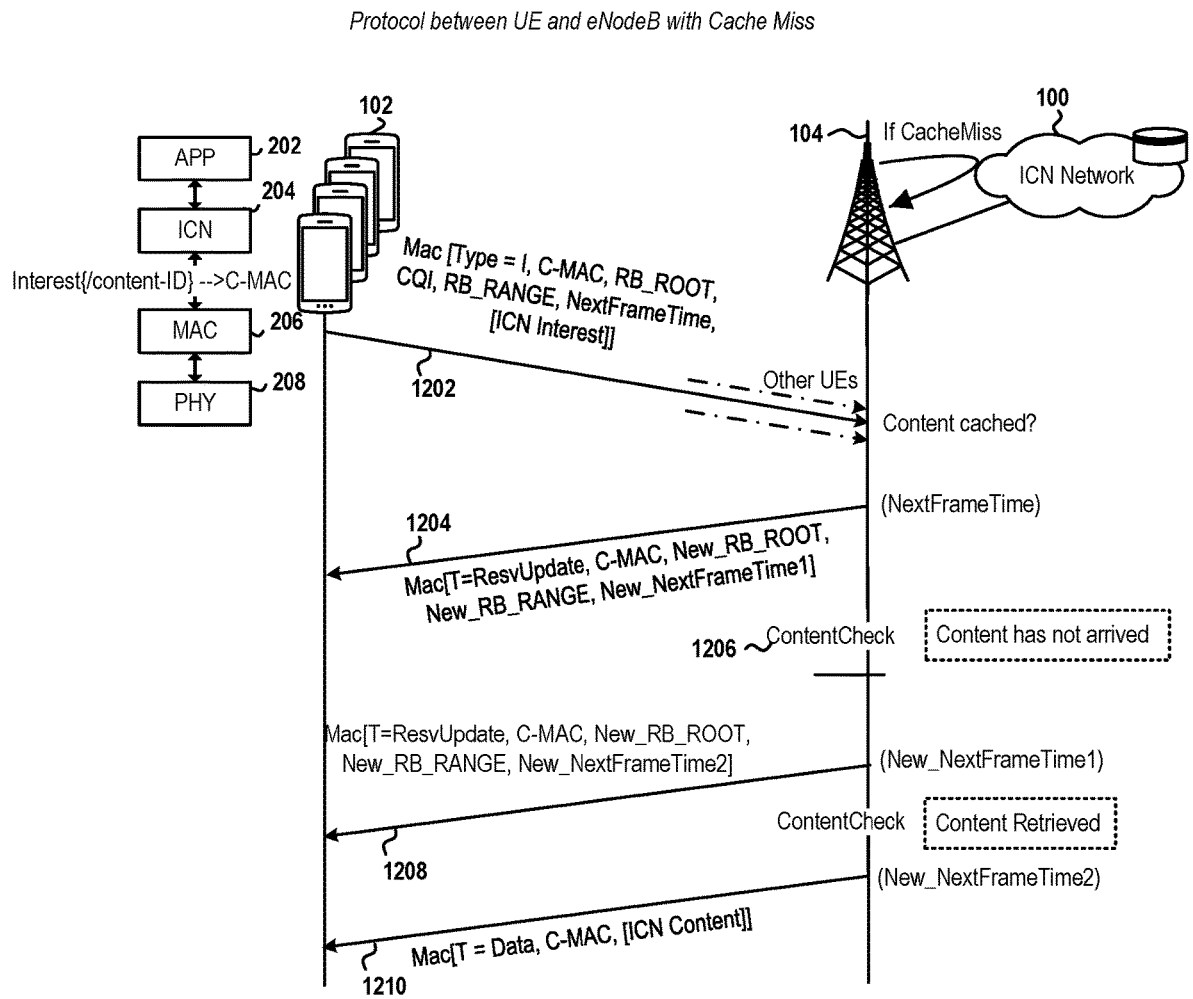
FIG. 12 is a schematic diagram illustrating an example of a protocol between one or more UEs and a BS having a content cached miss at the BS for enabling cross-layer receiver oriented dynamic multicast in cellular access in accordance with an embodiment.

FIG. 12 is a schematic diagram illustrating an example of a protocol between one or more UEs 102 and a BS 104 having a content cached miss at the BS 104 for enabling cross-layer receiver oriented dynamic multicast in cellular access in accordance with an embodiment. Similar to FIG. 11, the UE 102 determines a CMAC-ID, RB-Root, RB_RANGE, CQI, and NextFrameTime and transmits this information in a MAC interest message 1202 to the BS 104. The UE 102 saves the state of the CMAC-ID in the MAC layer 206. The BS 104 may receive numerous MAC interest messages 1202 from other UEs 102 as well. The BS 104 saves the state in the MAC Layer 206 and determines if the content is cached in the ICN layer 204. In this example, the content is not cached in the ICN layer 204. At the UE 102's NextFrameTime, the BS 104 transmits a ICN_NACK message 1204, along with the NewNextFrameTime1 indicating when the content will be ready to transmit. In one embodiment, the NewNextFrameTime1 is calculated based on estimated RTT for the content from the ICN network 100. In one embodiment, this may require prior knowledge of the content RTT statistics. The BS 104 at a specified time performs a content check 1206 to determine whether the content is ready to transmit. If the content is not retrieved at ContentCheck, then another MAC_NACK message 1208 is sent along with a New_NextFrameTime2 indicating when the content is expected. This cycle repeats until the content is ready. In various embodiments, the process may be configured to abort this process after a certain number of attempts. If the content never arrives, then an ICN-NACK message is sent. Once the content arrives and is ready, and there is no resource contention, the BS 104 transmits a MAC content message 1210 that includes the CMAC-ID and the requested ICN content data at the New_NextFrameTimeX.

In the above embodiments, the CMAC-ID is generated for each new content-ID. However, in an alternative embodiment, an optimization may be applied by taking advantage of the context in names. For example, a CMAC-ID may be the same for a set of all chunks belonging to an entire content such as, but not limited to, a movie (e.g., i.e., /movies/movie_name→CMAC-ID, hence /movies/movie_name/chunk-x→CMAC-ID→{DL RB Set}). In certain embodiments, with some enhanced control channel signaling, this C-MAC and mapping to RB-set can be sent once and avoid the control channel cost, unless the CQI of the UE 102 changes.

Figure 13:
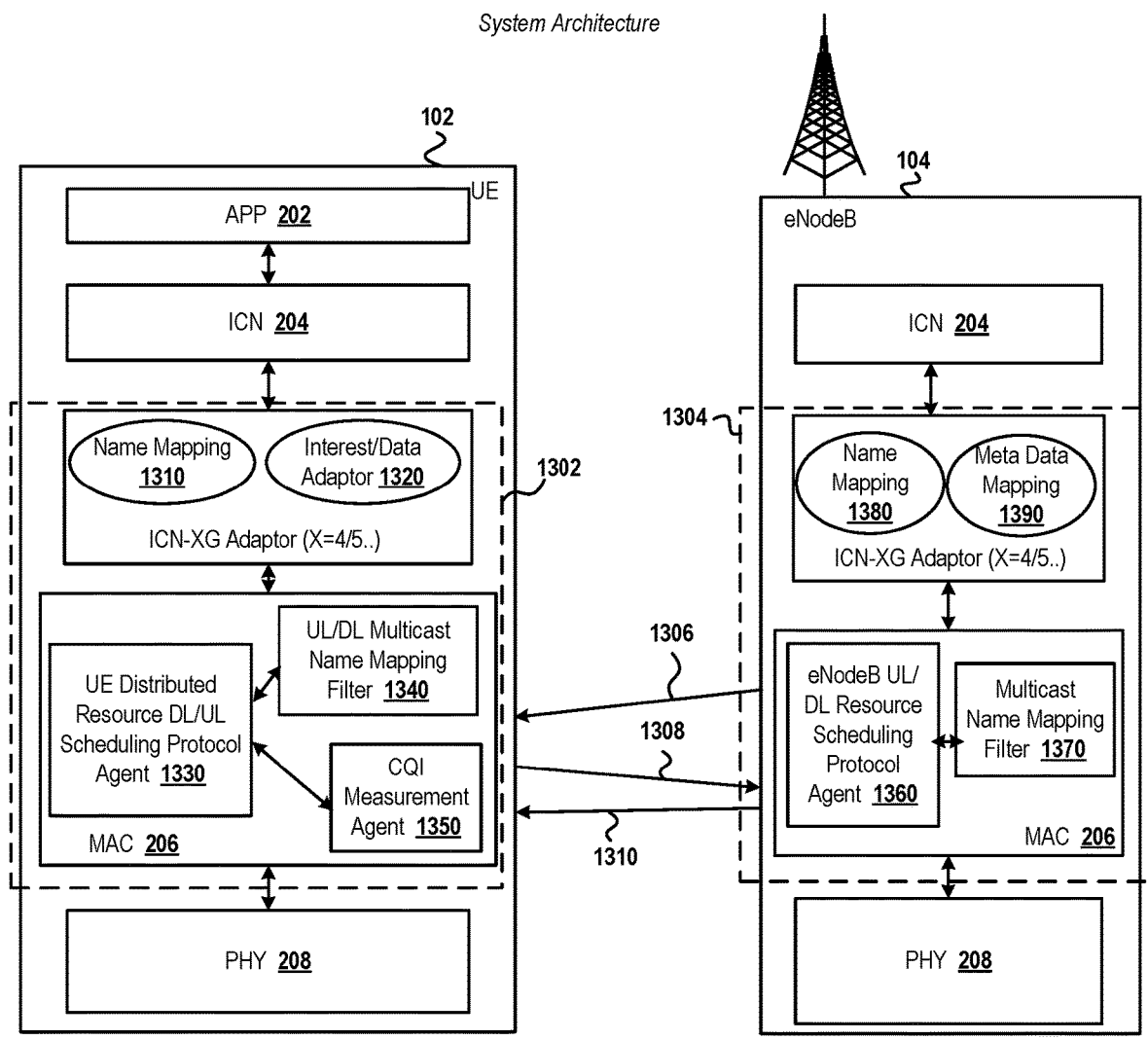
FIG. 13 is a schematic diagram illustrating an example of a system architecture of a UE and a BS for enabling cross-layer receiver oriented dynamic multicast in cellular access in accordance with an embodiment.

FIG. 13 is a schematic diagram illustrating an example of a system architecture of a UE 102 and a BS 104 for enabling cross-layer receiver oriented dynamic multicast in cellular access in accordance with an embodiment. In accordance with the disclosed embodiments, the UE 102 and the BS 104 include new modules 1302, 1304 for enabling cross-layer receiver oriented dynamic multicast in cellular access. For example, the UE 102 may include a name mapping module 1310 that is configured to map the ICN name to generate the CMAC-ID. The UE 102 may also include an interest/data adaptor module 1320 that uses the application programming interface (API) offered by the MAC layer 206 to send and receive interest/data objects along with any ICN metadata for MAC scheduling.

In the depicted embodiment, the UE 102 also includes UE Distributed Resource downlink/uplink (DL/UL) Scheduling Protocol Agent 1330, a UL/DL Multicast Name Mapping Filter Manager 1340, and a CQI Measurement Agent 1350 in the MAC layer 206. In one embodiment, the UE 102 Distributed Resource DL/UL Scheduling Protocol Agent 1330 is configured to monitor the schedule for sending out interest packet 1308 or for when to wait to receive a data packet at a given time (e.g., either as calculated by the UE 102 or as broadcast by BS 104). The UL/DL Multicast Name Mapping Filter Manager 1340 may be configured to manage all the options in a given request at a particular time from the UE 102 to ensure that requests are valid. The CQI Measurement Agent 1350 may be configured to measure the radio condition, and inform the UE 102 of the CQI so it may determine the RB_ROOT and RB_RANGE as described above.

In the depicted embodiment, the BS 104 includes an eNodeB UL/DL Resource Scheduling Protocol Agent 1360 and a Multicast Name Mapping Filter 1370 in the MAC layer 206. In one embodiment, the eNodeB UL/DL Resource Scheduling Protocol Agent 1360 may be configured to schedule the DL for content and to provide UL grants 1306 to UEs 102 for sending interest packets 1308. The Multicast Name Mapping Filter 1370 may be configured to hold the state of the names (outstanding CMAC-ID) expressed by applications and those that are received from the other users. The Multicast Name Mapping Filter 1370 manages all the CMAC-IDs that have been requested and that are outstanding at the BS 104 at a given time.

Similar to the UE 102, the BS 104 may also include a name mapping module 1380 and a metadata mapping module 1390. In one embodiment, the name mapping module 1380 is configured to un-map the CMAC-ID to determine the ICN name. The metadata mapping module 1390 may be configured to map ICN metadata for MAC scheduling.

Figure 14:
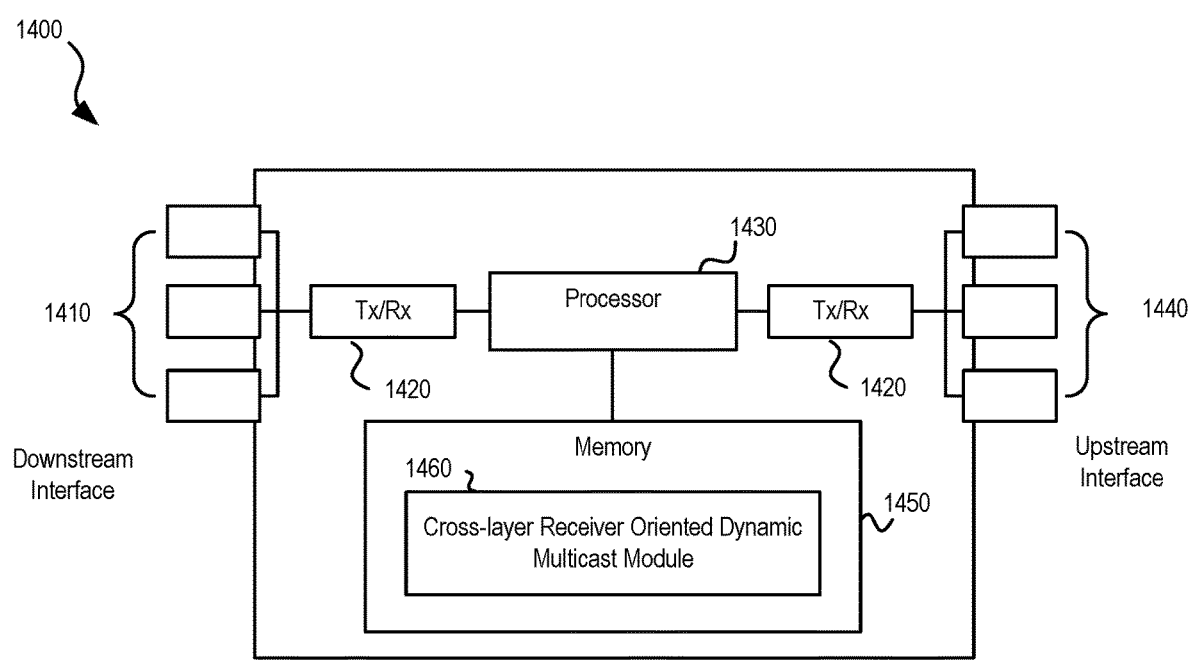
FIG. 14 is a schematic diagram illustrating an example of a network element that may be configured to implement one or more of the disclosed embodiments.

FIG. 14 is a schematic diagram illustrating an example of a network element 1400 that may be configured to implement one or more of the methods disclosed herein. For example, in some embodiments, a UE, enodeB, or BS may be implemented using a device having components similar to that of the network element 1400. The network element 1400 comprises a downstream interface 1410; an upstream interface 1440; and one or more transceiver units (Tx/Rx) 1420. The one or more transceiver units (Tx/Rx) 1420 are coupled to the downstream interface 1410 and the upstream interface 1440 for enabling the network element 1400 to send and receive data from other devices.

The network element 1400 further includes one or more processors, logic units, or central processing units (CPUs) 1430 coupled to the one or more transceiver units 1420; and a memory 1450 coupled to the one or more processors 1430. The CPUs 1430 are implemented by any suitable combination of hardware, middleware, and/or firmware. The CPUs 1430 may be implemented as one or more CPU chips, cores (e.g. as a multi-core processor), field-programmable gate arrays (FPGAs), application specific integrated circuits (ASICs), or digital signal processors (DSPs). The CPUs 1430 are in communication with the downstream interface 1410, Tx/Rx 1420, upstream interface 1440, and memory 1450.

The memory 1450 comprises one or more disks, tape drives, or solid-state drives and may be used as an over-flow data storage device, to store programs when such programs are selected for execution, or to store instructions and data that are read during program execution. For example, in one embodiment, the memory 1450 stores a cross-layer receiver oriented dynamic multicast module 1460 that comprises instructions and data configurations that when executed by the CPUs 1430 implement the disclosed embodiments. For example, the cross-layer receiver oriented dynamic multicast module 1460 may include the modules described in FIG. 13. The memory 1450 may be volatile and/or non-volatile and may be read-only memory (ROM), random-access memory (RAM), ternary content-addressable memory (TCAM), or static random-access memory (SRAM).

The description of the network element 1400 is not intended to describe every minute detail of the various components that may be included in a UE or a BS device. It should be understood by one of ordinary skill in the art, that the network element 1400 may be modified by adding or removing one or more components to serve the particular functions of a UE or a BS. For example, in certain embodiments, a UE may not include the downstream interface 1410 and the upstream interface 1440. Other modifications may also be readily apparent.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude, or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a user equipment (UE) for enabling cross-layer receiver oriented dynamic multicast in cellular access, the method comprising:
   receiving an information-centric networking content-identifier (ICN-CID) from an application;
   generating a content medium access control identifier (CMAC-ID) using the ICN-CID, wherein the CMAC-ID maps the ICN-CID to a medium access control (MAC) layer;
   transmitting a MAC interest message to an ICN network, the MAC interest message comprising the CMAC-ID, a channel quality indicator (CQI), and an ICN interest payload;
   receiving from the ICN network a MAC reserve-broadcast message comprising the CMAC-ID and a control physical (PHY) layer schedule for receiving content response; and
   receiving from the ICN network a MAC content message comprising the CMAC-ID and ICN content data based on the control PHY layer schedule.

2. The method of claim 1, wherein generating the CMAC-ID comprises mapping the ICN-CID to a dynamic multicast identifier (ID).

3. The method of claim 1, wherein generating the CMAC-ID comprises performing a hash function using the ICN-CID.

4. A method performed by a user equipment (UE) for enabling cross-layer receiver oriented dynamic multicast in cellular access, the method comprising:
receiving an information-centric networking content-identifier (ICN-CID) from an application;
generating a content medium access control identifier (CMAC-ID) using the ICN-CID, wherein the CMAC-ID maps the ICN-CID to a medium access control (MAC) layer;
determining a UE assigned downlink (DL) channel assignment schedule from the CMAC-ID;
transmitting a MAC interest message to an ICN network, the MAC interest message comprising the CMAC-ID, a channel quality indicator (CQI), the UE assigned DL channel assignment schedule, and an ICN interest payload; and
receiving, from the ICN network, a MAC content message comprising the CMAC-ID and ICN content data based on the UE assigned DL channel assignment schedule.

5. A method performed by a user equipment (UE) for enabling cross-layer receiver oriented dynamic multicast in cellular access, the method comprising:
receiving an information-centric networking content-identifier (ICN-CID) from an application;
generating a content medium access control identifier (CMAC-ID) using the ICN-CID, wherein the CMAC-ID maps the ICN-CID to a medium access control (MAC) layer;
determining a UE assigned DL channel assignment schedule from the CMAC-ID;
transmitting a MAC interest message comprising the CMAC-ID, a channel quality indicator (CQI), the UE assigned DL channel assignment schedule, and an ICN interest payload;
receiving a reservation update MAC frame comprising the CMAC-ID and an updated UE assigned DL channel assignment schedule; and
receiving a MAC content message comprising the CMAC-ID and ICN content data based on the updated UE assigned DL channel assignment schedule.

6. The method of claim 5, wherein the UE assigned DL channel assignment schedule comprises:
a resource block root (RB_root) based on a maximum number of resource blocks (RBs) available for DL scheduling (Max_RB), wherein the RB_root is determined using a function that uses the CMAC-ID and the Max_RB;
a resource block range (RB_range) based on the RB_root and a number of required RBs (RB_NUM), the RB_NUM determined based on information from an ICN layer indicating an expected size of a data response; and
a next frame time indicting when the UE will listen for a response for a next sub-frame.

7. The method of claim 6, wherein the function for determining the RB_root also uses the CQI.

8. A method performed by a base station device for enabling cross-layer receiver oriented dynamic multicast in cellular access, the method comprising:
receiving a medium access control (MAC) interest message from a user equipment (UE), the MAC interest message comprising a content medium access control identifier (CMAC-ID), a channel quality indicator (CQI), and an information-centric networking (ICN) interest payload;
transmitting to the UE a MAC reserve-broadcast message comprising the CMAC-ID and a control physical (PHY) layer schedule for receiving content response; and
transmitting to the UE a MAC content message comprising the CMAC-ID and ICN content data based on the control PHY layer schedule.

9. A method performed by a base station device for enabling cross-layer receiver oriented dynamic multicast in cellular access, the method comprising:
receiving a medium access control (MAC) interest message comprising a content medium access control identifier (CMAC-ID), a channel quality indicator (CQI), a user equipment (UE) assigned downlink (DL) channel assignment schedule, and an information-centric networking (ICN) interest payload;
determining whether a requested content is stored at the base station device;
in response to a determination that the requested content is stored at the base station device:
determining whether a scheduling conflict exists with the UE assigned DL channel assignment schedule;
transmitting a MAC content message comprising the CMAC-ID and ICN content data based on the UE assigned DL channel assignment schedule in response to a determination that there is no scheduling conflict with the UE assigned DL channel assignment schedule; and
transmitting a reservation update MAC frame comprising the CMAC-ID and an updated UE assigned DL channel assignment schedule in response to a determination that there is a scheduling conflict with the UE assigned DL channel assignment schedule, and transmitting the MAC content message comprising the CMAC-ID and ICN content data based on the updated UE assigned DL channel assignment schedule.

10. The method of claim 9, further comprising:
in response to a determination that the requested content is not stored at the base station device:
transmitting, at a first next frame time indicated in the UE assigned DL channel assignment schedule, a reservation update MAC frame comprising the CMAC-ID and the updated UE assigned DL channel assignment schedule;
requesting the requested content from an ICN network;
continuously transmitting a new reservation update MAC frame comprising the CMAC-ID and a newly updated UE assigned DL channel assignment schedule at a new updated next frame time indicated in the newly updated UE assigned DL channel assignment schedule until one of the requested content is received from the ICN network or a time threshold is met;
in response to receiving the requested content from the ICN network, transmitting, at the new updated next frame time, the MAC content message comprising the CMAC-ID and the ICN content data based on the updated UE assigned DL channel assignment schedule; and
in response to not receiving the requested content from the ICN network within the time threshold is met, transmitting, at the new updated next frame time, a negative acknowledgment MAC frame indicating that the requested content cannot be retrieved.

11. A user equipment (UE) comprising a memory configured to store computer-executable instructions, that when executed by a processor cause the processor to:
receive a content-name from an application;
generate a content medium access control identifier (CMAC-ID) using the content-name, wherein the CMAC-ID maps the content-name to a medium access control (MAC) layer;
transmit a MAC interest message to an information-centric networking (ICN) network, the MAC interest message comprising the CMAC-ID, a channel quality indicator (CQI), and an ICN interest payload;
receive from the ICN network a MAC reserve-broadcast message comprising the CMAC-ID and a control physical (PHY) layer schedule for receiving content response; and
receive from the ICN network a MAC content message comprising the CMAC-ID and ICN content data based on the control PHY layer schedule.

12. The UE of claim 11, wherein generating the CMAC-ID comprises mapping the content-name to a dynamic multicast identifier (ID).

13. The UE of claim 11, wherein generating the CMAC-ID comprises performing a hash function using the content-name.

14. A user equipment (UE) comprising a memory configured to store computer-executable instructions, that when executed by a processor cause the processor to:
receive a content-name from an application;
generate a content medium access control identifier (CMAC-ID) using the content-name, wherein the CMAC-ID maps the content-name to a medium access control (MAC) layer;
determine a UE assigned downlink (DL) channel assignment schedule from the CMAC-ID;
transmit a MAC interest message to an ICN network, the MAC interest message comprising the CMAC-ID, a channel quality indicator (CQI), the UE assigned DL channel assignment schedule, and an ICN interest payload; and
receive from the ICN network a MAC content message comprising the CMAC-ID and ICN content data based on the UE assigned DL channel assignment schedule.

15. A user equipment (UE) comprising a memory configured to store computer-executable instructions, that when executed by a processor cause the processor to:
receive a content-name from an application;
generate a content medium access control identifier (CMAC-ID) using the content-name, wherein the CMAC-ID maps the content-name to a medium access control (MAC) layer;
determine a UE assigned DL channel assignment schedule from the CMAC-ID;
transmit a MAC interest message comprising the CMAC-ID, a channel quality indicator (CQI), a UE assigned DL channel assignment schedule, and an ICN interest payload;
receive a reservation update MAC frame comprising the CMAC-ID and an updated UE assigned DL channel assignment schedule; and
receive a MAC content message comprising the CMAC-ID and ICN content data based on the updated UE assigned DL channel assignment schedule.

16. A base station device for enabling cross-layer receiver oriented dynamic multicast in cellular access, the base station device comprising a memory configured to store computer-executable instructions, that when executed by the processor cause a processor to:
receive a medium access control (MAC) interest message from a user equipment (UE), the MAC interest message comprising a content medium access control identifier (CMAC-ID), a channel quality indicator (CQI), and an information-centric networking content-identifier (ICN-CID) interest payload;
transmit to the UE a MAC reserve-broadcast message comprising the CMAC-ID and a control physical (PHY) layer schedule for receiving content response; and
transmit to the UE a MAC content message comprising the CMAC-ID and ICN content data based on the control PHY layer schedule.

17. A base station device for enabling cross-layer receiver oriented dynamic multicast in cellular access, the base station device comprising a memory configured to store computer-executable instructions, that when executed by the processor cause a processor to:
receive a medium access control (MAC) interest message comprising a content medium access control identifier (CMAC-ID), a channel quality indicator (CQI), a user equipment (UE) assigned downlink (DL) channel assignment schedule, and an information-centric networking (ICN) interest payload;
determine whether a requested content is stored at the base station device;
in response to a determination that the requested content is stored at the base station device:
determine whether a scheduling conflict exists with the UE assigned DL channel assignment schedule;
transmit a MAC content message comprising the CMAC-ID and ICN content data based on the UE assigned DL channel assignment schedule in response to a determination that there is no scheduling conflict with the UE assigned DL channel assignment schedule; and
transmit a reservation update MAC frame comprising the CMAC-ID and an updated UE assigned DL channel assignment schedule in response to a determination that there is a scheduling conflict with the UE assigned DL channel assignment schedule, and transmitting the MAC content message comprising the CMAC-ID and ICN content data based on the updated UE assigned DL channel assignment schedule.

18. The base station device of claim 17, wherein the processor is further configured to execute the computer-executable instructions to:
in response to a determination that the requested content is not stored at the base station device:
transmit, at a first next frame time indicated in the UE assigned DL channel assignment schedule, a reservation update MAC frame comprising the CMAC-ID and the updated UE assigned DL channel assignment schedule;
request the requested content from an ICN network;
continuously transmit a new reservation update MAC frame comprising the CMAC-ID and a newly updated UE assigned DL channel assignment schedule at a new updated next frame time indicated in the newly updated UE assigned DL channel assignment schedule until one of the requested content is received from the ICN network or a time threshold is met;

in response to receiving the requested content from the ICN network, transmit, at the new updated next frame time, the MAC content message comprising the CMAC-ID and the ICN content data based on the updated UE assigned DL channel assignment schedule; and in response to not receiving the requested content from the ICN network within the time threshold is met, transmit, at the new updated next frame time, a negative acknowledgment MAC frame indicating that the requested content cannot be retrieved.

\* \* \* \* \*